UNITED STATES PATENT OFFICE.

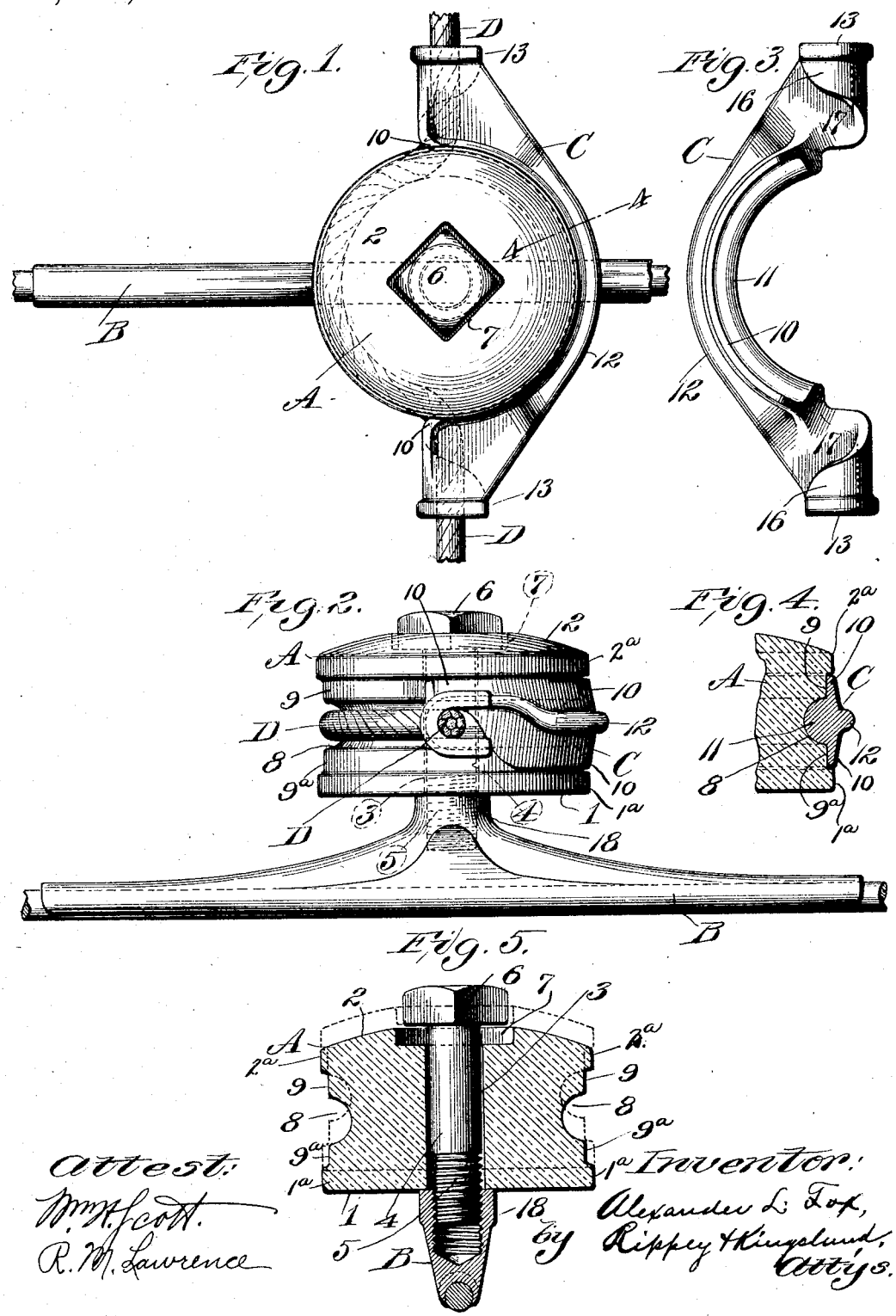

ALEXANDER L. FOX, OF EAST ST. LOUIS, ILLINOIS, ASSIGNOR, BY MESNE ASSIGNMENTS, TO T. C. WHITE ELECTRICAL SUPPLY COMPANY, A CORPORATION OF MISSOURI.

TROLLEY-WIRE HANGER.

1,183,182.  Specification of Letters Patent.  Patented May 16, 1916.

Application filed November 19, 1913. Serial No. 801,799.

*To all whom it may concern:*

Be it known that I, ALEXANDER L. FOX, a citizen of the United States, residing at the city of East St. Louis and State of Illinois, have invented a new and useful Trolley-Wire Hanger, of which the following is a specification.

This invention relates to new and useful improvements in trolley hangers, and consists in the novel design and arrangement of parts hereinafter fully disclosed.

An object of the invention is to provide a hanger for trolley wires, simple and durable in construction, and which may be adjusted with facility.

A further object of the invention is to provide a hanger for trolley wire which when assembled and constructed will be firmly locked in place preventing accidental displacement of the parts.

Another object of the invention is to provide a hanger of the class mentioned which will adequately insulate the main power wire from the lateral suspension wires.

To these and other ends I have designed, combined and arranged the parts of the form and in the manner hereinafter described, reference being made to the accompanying drawing, wherein I have illustrated a preferred embodiment of my invention, and in which—

Figure 1 is a plan view of my hanger assembled. Fig. 2 is a side elevation. Fig. 3 is a view of the yoke detached from the hanger. Fig. 4 is a section on the line 4—4 of Fig. 1, and Fig. 5 is a vertical section through the hanger illustrating the manner of attaching the trolley ear.

In the embodiment of my invention illustrated in the drawings, the hanger comprises a cylindrical body A composed of insulating material, preferably porcelain or some similar substance. The lower end or bottom 1 of the body is flat, and the top 2 of the body is rounded upwardly forming a convex or dome-like top. An axial hole 3 is formed through the body A, and is adapted to receive the bolt 4 having a threaded end 5 and a polygonal head 6. In the top 2 of the body A a polygonal recess 7 is formed in communication with the bolt hole 3, said recess receiving the head 6 of the bolt when all of the elements of the hanger are assembled together, in which adjustment the threaded end 5 of the bolt is engaged within a threaded hole in the trolley ear B. The cylindrical body A is formed with a circumferential flange $2^a$ at the upper end thereof, and with a circumferential flange $1^a$ at the lower end thereof, so that said flanges extend outwardly beyond the intervening surface of the cylindrical body. Approximately midway between the upper and lower circumferential flanges a circumferential groove 8 is formed in the cylindrical body A, being separated from the upper and lower flanges so as to leave a space 9 above said groove, and a similar space $9^a$ below said groove, said spaces comprising the surface of the cylindrical body between the flanges and said groove.

A yoke member C comprises a semicircular body 11 arranged to seat snugly within the groove 8, and two flanges 10 above and below said body, respectively, and arranged to bear against the surfaces 9 and $9^a$ of the cylindrical body A and having their edges terminating adjacent to the upper and lower walls of the flanges $1^a$ and $2^a$, respectively. The body portion 11 of the yoke C is formed with an outwardly extending reinforcing rib or flange 12, said flange being extended at each end of the yoke to form the seats 13 for a supporting wire D. The seats 13 for the wire are substantially U-shaped in end elevation, (Fig. 2), and the lower walls 16 are cut away or removed to form spaces 17 between the inner edges of said walls and the body 11 to permit insertion of the wire D within the seats 13.

In assembling the hanger the bolt 4 is placed within the hole 3, and the threaded end 5 of said bolt is screwed into a threaded hole in the central or body portion 18 of the trolley ear B. When the polygonal head 6 of the bolt becomes seated or engaged within the polygonal recess 7 the cylindrical body A may be utilized as an implement for the further rotation of the bolt, until the flat upper end of the body or shoulder 18 is drawn close against the flat under side of the body A and until the head 6 is clamped firmly against the lower wall of the recess 7. In this adjustment the body A and the member B are securely held together. In placing the yoke C in engagement with the body A the wire D and the yoke may be engaged with each other before being placed upon the body A. After the wire D has been seated in the seats 13 the body A may be passed between the wire and the yoke until the yoke and wire are in position to be received within the circumferential groove 8, with the flanges 10 bearing against the surface of the cylindrical body A between the upper and lower flanges thereon. The relatively wide flanges 10 bearing against the cylindrical surface of the body A are of material benefit in preventing turning of the yoke, while the upper and lower flanges 2ª and 1ª constitute additional abutments for preventing movement of the yoke, particularly at the opposite ends of the yoke where there is the greatest torsional strain. Thus, there is greater torsional strain at the ends of the yoke. It will be observed by reference to Figs. 1 and 2, that the upper flange 10 is extended above the seats 13 beyond the body portion 11, so that bearing for the yoke is provided above the seats 13 at both ends, notwithstanding the fact that the body portion 11 is cut away or removed to provide the spaces 17. The lower flange 1ª resists downward movement of the arcuate portion of the yoke between the wire seats, and thus the upper and lower flanges on the body portion A coöperate with the flanges 10 to prevent displacement of the body A with respect to the yoke and the wire D.

What I claim and desire to secure by Letters Patent is:

1. A trolley wire hanger, comprising a porcelain body, an upper circumferential flange on said body, a lower circumferential flange on said body, a seat for the yoke intermediate of said flanges and comprising a circumferential groove around said body and cylindrical surfaces above and below said groove extending to said flanges, a yoke having a body portion adapted to seat within said groove, engaging portions at the ends of said yoke for engaging with the supporting wire, an upwardly extending flange integral with said engaging portions adapted to engage the cylindrical surface above said groove and to abut against said upper flange, a flange below the body portion of said yoke adapted to engage against the cylindrical surface below said groove and to abut against the said lower flange, and means for attaching said cylindrical body to a trolley ear.

2. A trolley wire hanger, comprising a porcelain body, a seat for the yoke comprising a circumferential groove and cylindrical surfaces above and below said groove, an upper circumferential flange above the upper cylindrical surface, a lower circumferential flange below the lower cylindrical surface, an arcuate yoke body adapted to seat within said groove, engaging portions integral with and extending beyond the ends of said yoke body adapted to engage with the supporting wire, a flange integral with the upper side of said engaging portions and said yoke body adapted to bear against the upper cylindrical surface and to abut against said upper flange above said engaging portions and above the wire engaged thereby effectively to prevent torsion of said yoke with respect to said body, and a flange integral with said yoke body adapted to bear against the lower cylindrical surface and to abut against said lower circumferential flange.

3. A trolley wire hanger, comprising a porcelain body, a seat for the yoke comprising a circumferential groove adapted to receive a supporting wire and the yoke, and cylindrical surfaces above and below said groove, an arcuate yoke body adapted to seat within said groove, engaging portions integral with and extended beyond the ends of said yoke body adapted to engage with the supporting wire, a flange integral with the upper side of each of said engaging portions adapted to bear against said cylindrical surface above said engaging portions and above the wire engaged thereby effectively to prevent torsion of said yoke with respect to said porcelain body, and a flange integral with the intermediate lower side of said yoke adapted to bear against the lower cylindrical surface to coöperate with said first-named flange to prevent torsion of said yoke.

In witness whereof, I have signed this specification in the presence of two subscribing witnesses.

ALEXANDER L. FOX.

Witnesses:
L. C. KINGSLAND,
THOMAS C. WHITE.

Copies of this patent may be obtained for five cents each, by addressing the "Commissioner of Patents. Washington, D. C."